Aug. 1, 1933.   W. O. BRASSERT   1,920,627
MEANS AND METHOD OF COATING CONCRETE SILO BLOCKS
Filed Jan. 12, 1931

Inventor,
Walter O. Brassert
By Minturn & Minturn
Attorneys.

Patented Aug. 1, 1933

1,920,627

UNITED STATES PATENT OFFICE 1,920,627

MEANS AND METHOD OF COATING CONCRETE SILO BLOCKS

Walter O. Brassert, Kalamazoo, Mich.

Application January 12, 1931. Serial No. 508,107

9 Claims. (Cl. 91—70)

It is a well known fact that the juice of ensilage is absorbed to a greater or lesser extent into the surface of concrete blocks or slabs used in the construction of silo walls. This absorption is damaging for two reasons: first of all it causes the ensilage next to the silo wall to be deprived of moisture needed in its proper curing and fermentation; as a result the ensilage to a certain depth from the wall is frequently mouldy and off-colour; next, the ensilage juice, containing sugar and acids, reacts chemically with the cement in the concrete wall, causing its decomposition and the gradual destruction of the wall. Heretofore it has been customary to give the silo wall a coating of neat cement, or a plaster coat of sand and cement sometimes with the addition of a waterproofing compound. Applied under field conditions, such a coat will be neither uniform in thickness nor will the cement always have a chance for proper curing. But even under the most favorable conditions the cement of which the coat is composed, is subject to the surface—and penetrating—action of the sugars and acids in the ensilage, which will cause it to gradually soften and disintegrate, leaving the block or slab itself without adequate protection.

Attempts to apply a coat of materials other than cement, such as asphalt or paraffin, which are not affected by ensilage, have so far failed, or the methods used in making such applications have been found commercially impractical. The usual asphalt paints do not form a permanent bond with the cement; they soon peel off. Also, ensilage sticks to the asphalt and in removing it, the asphalt comes off with it. Paraffin could only be applied as a spray, dissolved in gasolene or similar inflammable solvents. To have this applied to the inside of all farm silos would be out of the question on account of the danger to the operator. Finally, it is necessary to use cement in filling the joints between slabs or blocks, as cement alone bonds with the concrete to insure structural strength in the silo wall and to form a permanent seal. Now this cement would be prevented from curing through proper crystallization and hydration by the presence of the solvents in the paraffin solution or asphalt paint. Obviously, it would be commercially impractical to have the constructors first fill the joints with cement and then wait around for a day or two before applying the spray or paint.

These difficulties can all be overcome by infusing the inside surface of the concrete staves or blocks with paraffin or asphalt or other waxy or bituminous substances at the factory before they are shipped, and doing it in such a way that the paraffin or asphalt will actually be deposited in the pores of the concrete to a substantial depth from the surface. In that manner the concrete and the paraffin or asphalt, will be interlaced and there could never be a separation through abrasion or lack of bond. Also, the concrete is positively protected against penetration and surface action of ensilage juices. However, one thing is necessary: The edges of the slabs or blocks must be without paraffin or asphalt, so that they can bond with the cement which is forced into the joint to make the wall continuous.

The object of this invention is to accomplish the infusion of the staves or blocks with a waxy or bituminous substance to a substantial depth from the surface and also have the edges of the slabs or blocks uncoated so the cement joints can bond.

I have illustrated the salient features of my method by means shown quite diagrammatically in the accompanying drawing, in which Fig. 1 is a plan view with the link belt carrier removed over the initial tables;

Like characters of reference indicate like parts in the several views of the drawing.

Figure 1:
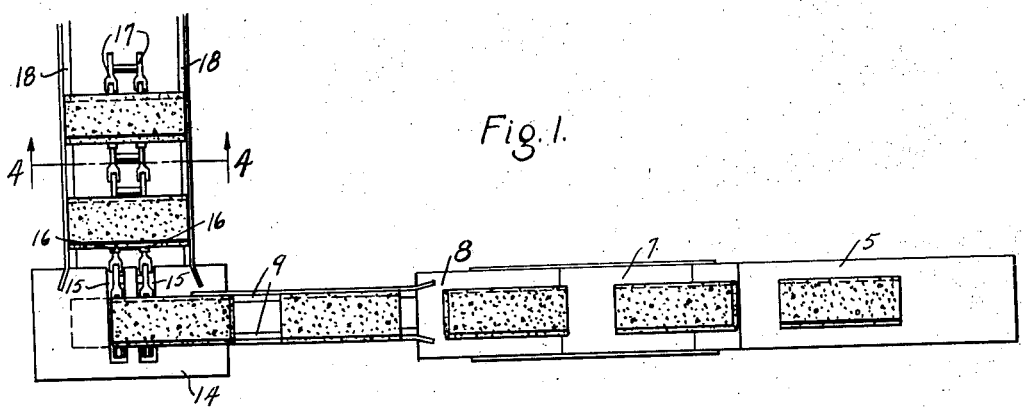
Figure 2:
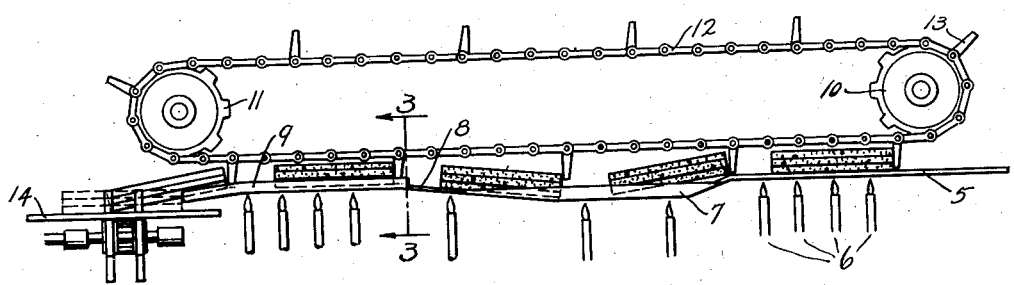
Fig. 2 is a side elevation of the assembly shown in Fig. 1, with the link-belt carrier installed.
Figure 4:
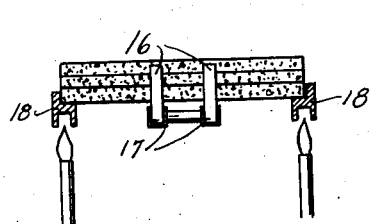
Fig. 4 is a vertical section on the line 4—4 of Fig. 1.
Figure 3:
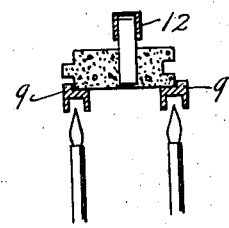
Fig. 3 is a vertical section on the line 3—3 of Fig. 2.

A flat plate 5, of iron or other metal, is heated by any suitable means here indicated by gas burners 6, and terminates at the rim of a flat pan 7. The pan 7 contains a sufficient quantity of molten paraffin or asphalt and the opposite side of the pan from plate 5 slopes up to an inclined plate 8, also heated so that the excess of paraffin or asphalt adhering to a block will drain back into the pan. On the opposite side of the plate 8 from the pan are a pair of rails 9, 9 with angular channels in their upper inner edges in which the paraffined slabs or blocks are slidingly moved. The horizontal members of the channels are just wide enough to keep the slabs or blocks from falling through and the vertical channel members extend as far up as it is desired to remove the paraffin coating. The rails 9, 9 are also heated.

Located above the plate 5 is a revolvable shaft carrying a sprocket wheel 10 and located above the far ends of the rails 9, 9 is a shaft on which a sprocket wheel 11 is mounted. A link belt 12 travels around the wheels 10 and 11, and appropriate ones of the links are provided with fingers 13, which contact a slab or block laid on plate 5 and move it through the pan 7 and over plate 8 and rails 9, 9 and discharges it from said rails upon a table 14.

The table 14 is formed with a pair of parallel slots 15, 15 extending from the far side, for the passage therethrough of fingers 16, 16 from a double link belt 17, 17 located and travelling below the table in order not to interfere with the mechanism and delivery of slabs or blocks upon table 14.

Located adjacent the far edge of table 14 are the two rails 18, 18, similar to the rails 9, 9, previously described, upon which the slabs or blocks are moved by the link belt 17. It will be noted, however that different block edges contact these rails 18. The rails 18 are heated.

In the practice of my method the preformed concrete slab or block is placed on the hot plate 5 which drives the moisture out of the surface of the concrete and heats it so the paraffin or asphalt will penetrate readily. From the hot plate the block is dragged into the flat pan 7 containing a sufficient depth of molten paraffin or asphalt to coat the block to the height of about one half inch all around.

Next the block is dragged up the moderately inclined plate 8 heated so that any excess paraffin or asphalt adhering in drops or lumps will melt and flow back into the pan. Next the block is dragged onto the parallel rails 9, 9, which are shaped so they closely follow the contour of the edges and sides of the block, but do not extend under the surface of the block any further than necessary to keep the block from falling through. These rails are heated to a temperature high enough to drive all of the paraffin or asphalt out of the surfaces opposite the rails by melting and distillation, leaving the concrete there, exposed the same as before the paraffin or asphalt were applied.

In order to likewise remove the paraffin or asphalt from the two other sides and edges of the block the latter is next dragged over the other pair of rails 18, 18, which engage the block at the two other sides and which are also heated to drive the paraffin or asphalt out of the two other sides and edges of the block. The block is then ready for construction, having a thoroughly impregnated inner surface but with exposed sides and edges which will bond with the cement used in making the joints between the blocks.

Having thus fully described my invention what I claim as new and wish to secure by Letters Patent, is—

1. The method of proofing a preformed silo slab against ensilage acids and moisture which comprises heating one face of the slab to remove moisture, partially immersing the slab in molten paraffin or asphalt to coat and impregnate the heated face and then draining off excess paraffin or asphalt.

2. The method of proofing a preformed silo slab against ensilage acids and moisture, which comprises heating one face of the slab to remove moisture, partially immersing the slab in molten paraffin or asphalt to coat and impregnate the heated face and then heating the slab to facilitate the draining off of excess paraffin or asphalt.

3. The method of proofing preformed concrete silo wall members against ensilage acids and moisture which consists in infusing the inner surfaces of the wall members with paraffin and then removing the paraffin from the edges of the members before the members are assembled in the silo wall, whereby the remaining paraffined surface will be proofed and the bonding of the joint forming material with the concrete will not be interfered with.

4. The method of proofing preformed concrete silo wall members against ensilage acids and moisture which consists in infusing the inner surfaces of the wall members with a bituminous material such as asphalt and then removing said material from the edges of the members before the members are assembled in the silo wall.

5. The method of proofing preformed concrete silo wall members against ensilage acids and moisture which consists in preheating the inner surfaces of the wall members to drive out excess moisture and facilitate absorption and then contacting the heated surfaces with ensilage acid and moisture resistant material in a molten state and then removing said material from the edges of the members before the members are assembled in a silo wall.

6. The method of proofing preformed concrete silo wall members against ensilage acids and moisture which consists in infusing the inner surfaces of the members with an ensilage acid and moisture resistant material and then removing said resistant material from the edges of the wall members by heat.

7. The method of proofing preformed concrete silo wall members against ensilage acids and moisture which consists first in heating the surface to be treated to drive out excess moisture and facilitate absorption, then placing the heated surface in a bath of molten ensilage acid and moisture resistant material and then removing the resistant material from the edges of the wall member thus treated by subjecting them to heat.

8. In a device for proofing preformed cement silo members against ensilage acids and moisture, a hot plate on which the member is preheated, a pan into which the plate discharges containing ensilage acid and moisture resistant material in a melted fluid condition, and a plurality of hot rails on which the silo member is deposited after leaving the pan to remove the resistant material from the edges of the silo member by heat from the rails.

9. In a device for proofing preformed cement silo members against ensilage acids and moisture, a hot plate on which the member is preheated, a pan into which the plate discharges containing ensilage acid and moisture resistant material in a melted fluid condition, and a plurality of hot rails on which the silo member is deposited after leaving the pan to remove the resistant material from the edges of the silo member by heat from the rails, and means for moving the silo member through the several instrumentalities of the device.

WALTER O. BRASSERT.